United States Patent [19]

Kobayashi

[11] 4,222,536
[45] Sep. 16, 1980

[54] DEVICE FOR SENSING AND INDICATING THE END OF A TAPE IN A TAPE RECORDER

[75] Inventor: Minoru Kobayashi, Hachioji, Japan

[73] Assignee: Olympus Optical Co., Ltd., Tokyo, Japan

[21] Appl. No.: 943,614

[22] Filed: Sep. 19, 1978

[51] Int. Cl.³ .................. G03B 1/04; G11B 15/32; G11B 23/04

[52] U.S. Cl. .................. 242/191; 200/61.17; 242/198

[58] Field of Search .............. 242/190, 191, 198–200, 242/186; 360/73, 96, 93; 200/61.13–61.18

[56] References Cited

U.S. PATENT DOCUMENTS 3,971,528  7/1976  Komatsu et al. .................. 242/191
4,123,015  10/1978  Komatsu et al. .................. 242/191

Primary Examiner—Leonard D. Christian
Attorney, Agent, or Firm—Toren, McGeady and Stanger

[57] ABSTRACT

In the device disclosed, a rotatable tape end sensing lever is connected to a tape supply shaft at one end and an operational switch at the other end. In normal operation, a fly-wheel having an annular projection runs clear of the operational switch. At the end of the tape, the tension turns the lever which shifts the switch toward the annular projection. A break in the annular projection causes the switch to close and latches it. In one embodiment, a groove over a given angle of the rotating annular projection momentarily receives the switch and then moves into a position in which the switch is closed and an alarm signal is generated.

8 Claims, 5 Drawing Figures

FIG._4

DEVICE FOR SENSING AND INDICATING THE END OF A TAPE IN A TAPE RECORDER

BACKGROUND OF THE INVENTION

The present invention relates to a device for sensing and indicating the end of a tape in a recorder and for generating an end alarm signal on the basis of tape tension at the end of a tape.

In a tape recorder using a cassette, it is desirous to stop the tape as soon as the tape reaches its end.

In known devices when the tape reaches the end, therefore, the end is sensed by tape tension, an alarm sound is generated or the tape is automatically stopped.

However, in a tape recorder using a Microcassette developed by the assignee of the present application, the whole construction is very small and as a result, the amount of movement of a tape feed shaft during tape tension is very small, so that when the recorder is handheld, there is the possibility of misoperation due to oscillation or the like.

SUMMARY OF THE INVENTION

An object of the present invention is to eliminate the above described drawbacks.

Another object of the present invention is to provide a tape end sensing and indicating device suitable for a superminiature tape recorder for positively sensing tape tension at the end of a tape and generating an end alarm without any misoperation caused by oscillation or the like.

According to the present invention, a device for sensing and informing a tape end of a tape recorder comprises a rotatable tape end sensing lever connected to a tape supply shaft at one end and an operational switch at the other end, a flywheel having an annular projection part, touchably by the operational switch, if necessary, around the periphery, and an end sensing and indicating signal generating portion formed by a cut at a predetermined inclined angle at an inner peripheral portion of the projection of the flywheel, whereby when the sensing lever is rotated, the operational switch is moved into the sensing signal generating portion and an end sensing and informing signal is generated at a predetermined position.

DESCRIPTION OF THE PREFERRED EMBODIMENT

Figure 1:
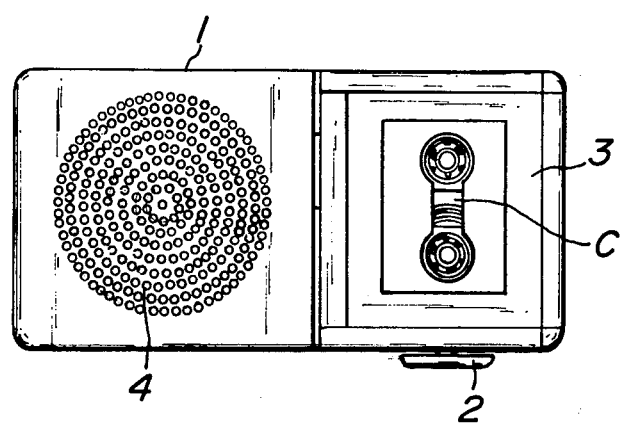
FIG. 1 is a plan view showing a tape recorder according to the present invention.
Figure 2:
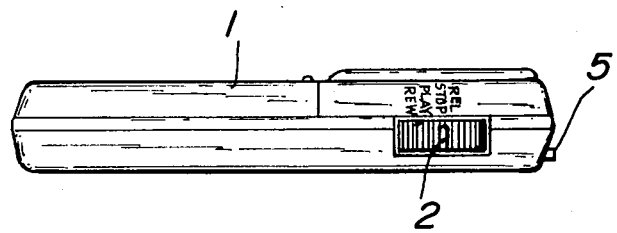
FIG. 2 is a side view of the tape recorder shown in FIG. 1.
Figure 3:
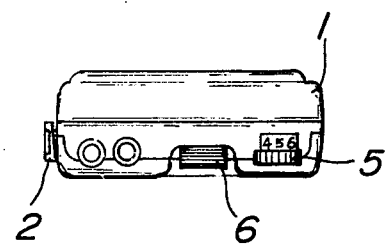
FIG. 3 is a front view of the tape recorder shown in FIG. 1.

FIGS. 1, 2 and 3 illustrate one embodiment of a tape recorder according to the present invention.

Here, a tape recorder 1 is about the size of a cigarette case. An operation button 2 is provided at the side portion of the recorder and a lid 3 is hinged on the upper front part thereof. A tape cassette C is mounted in or dismounted from a cassette receiving portion by opening the lid 3, while a speaker 4 is located at the lower part of the recorder 1.

A volume control 5, a microphone 6, an earphone jack, an external microphone jack and the like are mounted on the top of the recorder.

Figure 4:
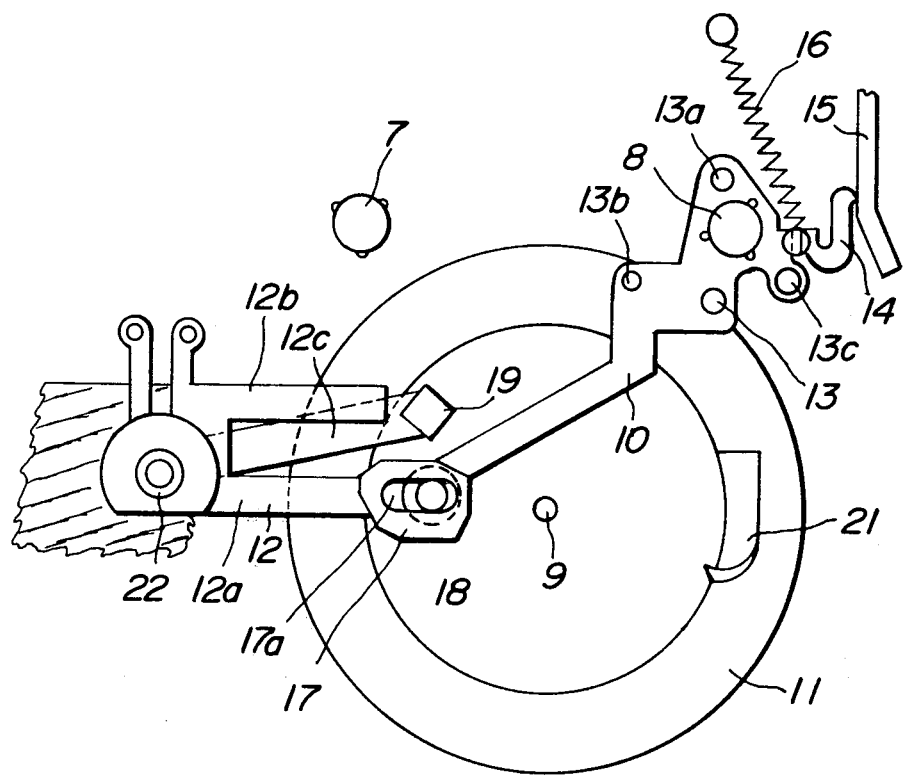
FIG. 4 is a plan view showing a drive mechanism of the device for use in a tape recorder according to the present invention.

FIG. 4 illustrates a drive mechanism of the tape recorder 1. Here, a reel or tape take-up shaft 7 and a reel supply or feed shaft 8 are driven by power transmitted from a capstan shaft 9 through, for instance, a belt or the like. The tape take-up shaft 7 is held not to displace axially, while the tape supply or feed shaft 8 is secured to one end of a swingable tape end sensing lever 10.

The tape end sensing lever 10 is rotatably supported by a shaft 13 for rotating the tape supply shaft 8 at one end and an end sensing switch 12 on a flywheel 11 at the other end as described above.

The sensing lever 10 forms a wide securing portion for the tape supply shaft 8. This wide portion is provided with projections 13a, 13b and 13c towards a substrate (not shown) for positioning the supply shaft 8 substantially at its center and a misoperation preventing member 14 projects integrally from the wide portion of the lever 10.

The misoperation preventing member 14 comes into contact with an operation lever 15 integrally provided on a recording operation button (not shown) at the stop position of the button. The member 14 and lever 15 are separated by a predetermined interval at the recording position.

A spring 16 between the base portion and the substrate of the misoperation preventing member 14 serves for rotating and biasing the sensing lever 10 counterclockwise.

Figure 5:
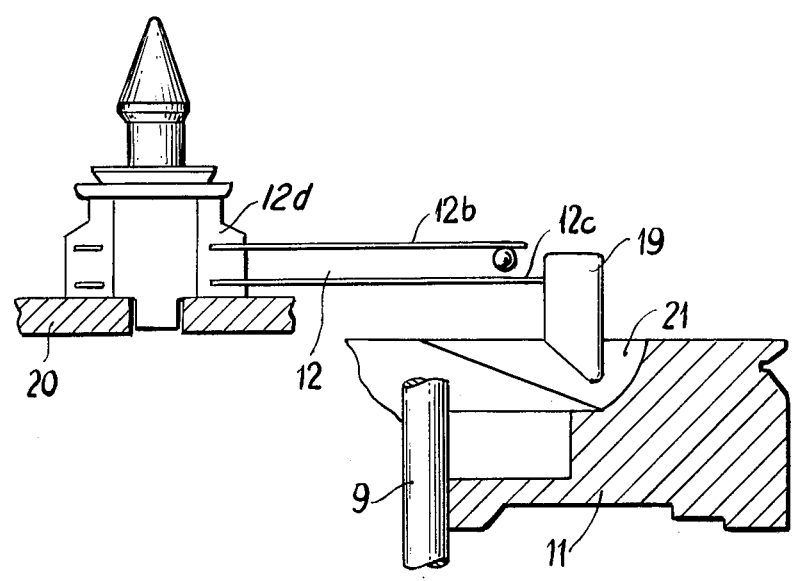
FIG. 5 is a partial and sectional view showing a detailed portion of the drive mechanism shown in FIG. 4.

On the other hand, the end sensing switch 12 is integral with an interlocking member 12a interlocked with the sensing lever 10. The switch 12 is composed of a contact member 12b forming a U-shape with and parallel to the member 12a and an operation member 12c for switching by contact with the contact member 12b. These members are integrally fixed to an insulating cylindrical member 12d. The end of the interlocking member 12a of the sensing switch 12 supported by the insulating cylindrical member 12d carries a guide member 17 having an elongate hole 17a of a predetermined length and formed with insulating material therein. The elongate hole 17a engages a coupling pin 18 provided at the other end of the tape end sensing lever 10. At the end of the operation member 12c opposite the contact member 12b of the sensing switch 12, a slidable member 19 composed of insulating material is slightly separated from the inner surface of the flywheel 11 as shown in FIG. 5.

The sensing switch 12 is rotatably secured to a substrate or panel 20 by means of a cassette guide pin 22 that projects into the cassette receiving portion of the tape recorder 1.

Around the inner peripheral surface of the flywheel 11 is provided a recess portion 21 for operating the slidable member 19. The recess portion 21 has an inclined surface for raising the slidable member 19 as the flywheel 11 is rotated and making the operation member 12c contact the contact member 12b.

The thus constructed tape recorder 1 can generate an alarm sound or the like for informing the tape end to a user when a magnetic tape is finished in a supply side reel of the cassette C during recording.

That is, if the recording operation button is pushed while a tape cassette C is mounted in the recess, the operation lever 15 is moved upwards to unlock the misoperation preventing member 14. Therefore, the tape end sensing lever 10 becomes rotatable, but does not perform any end sensing operation because it is biased counterclockwise by the spring 16.

When the tape at the supply side reaches the final end, the tension of the tape is suddenly applied to the supply shaft 8, so that the tape end sensing lever 10 fixed to the shaft 8 is rotated clockwise against the force of the spring 16.

Thus, the sensing switch 12 coupled to the end portion of the sensing lever 10 through the coupling pin 18 is rotated counterclockwise, and the slidable member 19 provided in the sensing switch 12 contacts the inner peripheral surface of the flywheel 11.

In this case, the end of the recess portion 21 provided in the flywheel 11, i.e., the lowermost portion, comes into contact with the slidable member 19 and enters the recess portion 21 as it is to indicate a tape end. However, in general, after the tape reaches the end and the supply shaft 8 is rotated in the clockwise direction, the end of a tape is indicated within one rotation of the flywheel 11. That is, together with the rotation of the tape end sensing lever 10 the slidable member 19 is being pressed on the inner peripheral surface of the flywheel 11, but the flywheel 11 and other drive mechanism are still operating. Therefore, the flywheel 11 is rotated while contacting the slidable member 19. When the recess portion 21 comes to the position of the slidable member 19, the slidable member 19 enters into the lowermost section of the recess portion 21 at once because the slidable member 19 is pressed by rotational force of the lever 10 due to the tape tension.

After the slidable member 19 enters into the recess portion 21, the flywheel 11 still rotates, so that the slidable member 19 is pushed up along the inclination of the recess 21, and contacts the contact member 12b at a predetermined position and turns the sensing switch 12 ON. This sensing switch 12, not illustrated, is located between the power source and the sensing device, for operating an oscillator or the like by turning the sensing switch 12 ON and generating an alarm sound from the speaker 4.

When the slidable member 19 enters into the recess portion 21 of the flywheel 11 and operates the switch 12 for an end alarm, it continues to be pressed on the projected plane of the flywheel 11, so that an alarm sound becomes continuous and a user can easily understand that the tape is ended.

In addition, the slidable member is always released from the recess portion, it again enters into the lowermost portion of the recess portion during the next rotation and is released at the higher portion. As a result, the alarm sound becomes continuous because the sensing switch repeats its ON-OFF operation.

As described above, the user who knows the tape end has been reached can operate the stop button and stop the whole tape recorder.

In this case, the operation lever 15 is again made into contact with the misoperation preventing member 14 for preventing rotation of the sensing lever, so that the tape end sensing mechanism is not operated even if there is a misoperation due to oscillation, a rapid wind or a rewind operation.

The present invention is not limited to the above embodiment but can be used as an auto-shut off mechanism for restoring a head, pinch roller and the like to the original state together with an auto-off mechanism or drive mechanism for stopping the drive mechanism such as a capstan shaft and the like.

This auto-shut off mechanism can be constructed so that rotation of the sensing lever is mechanically sensed and the recording operation button is turned OFF.

Only the case of sensing the end of the tape during recording is explained in the above. However, the tape end sensing lever can be operated during reproduction in order to operate the auto-shut off device and the like during reproduction.

As described above, according to the present invention, the end of the tape can be positively sensed with a simple construction without unnecessary driving of the tape recorder and misoperation of rapid wind or take-up or manual operation.

What is claimed is:

1. A device for sensing the end of a tape in a tape recorder having a tape supply shaft comprising: a rotatable tape end sensing lever connected to the tape supply shaft at one end and having an operational swtich at the other end, a flywheel having an annular projection touchable by the operational switch when the sensing lever is rotated, said annular projection forming a recess with a predetermined inclined angle at an inner portion of the projection of the flywheel for receiving the switch, the sensing lever being constructed so that when the lever is rotated, the operation switch is moved into the recess and an end sensing and indicating signal is generated at a predetermined position.

2. A tape recorder with a device fore sensing the end of a tape, comprising: a tape reel shaft for holding a tape, a lever connected to the tape reel shaft for movement in response to a change in tension at the end of a tape, a flywheel, a switch coupled to one end of the lever and having one portion positioned in the vicinity of the flywheel when the lever is free of the tension of the tape, said flywheel defining a circular path and having a discontinuity over a given segment of the path, said portion of the switch being located in the vicinity of said path and being movable into the path when the lever on said shaft responds to tension corresponding to the end of a tape, said discontinuity defining a surface with an angle for shifting the portion to a position on the flywheel which closes the switch.

3. A device as in claim 2, wherein said discontinuity is in the form of a recess.

4. A device as in claim 2, wherein said flywheel includes an annular projection having an inner periphery and an outer periphery, said portion being located adjacent the inner periphery and movable on said lever toward the inner periphery, said discontinuity being located at the inner periphery, said discontinuity, when encountering said portion, shifting the portion and thereby closing the switch.

5. A device as in claim 4, wherein said switch includes a first portion movable by the annular projection and the discontinuity therein and a second portion fixed relative to a plane of the annular projection.

6. A device as in claim 2, further comprising a manual control switch, said manual control switch having a member for maintaining said lever in the position in which the portion is out of said path when the manual control switch maintains the recorder in a stop position.

7. A device for indicating a tape end of a tape recorder having a tape supply shaft, comprising:

a rotatable tape end sensing lever having two ends connected to the tape supply shaft at one end and having an operational switch at the other end, said switch having a slidable member, a flywheel having an annular projection touchable to the slidable member of the operational switch, and an end sensing and signal generating part cut in an inner peripheral portion of the projection of the flywheel and having a surface inclined to the axial direction of the flywheel so that when the sensing lever is rotated, the slidable member of the operation switch is moved into the sensing signal generating part and an end sensing and informing signal is generated by the action of the operational switch.

8. A device as in claim 1, wherein the operational switch has a pair of leaf members, and the switch is closed by movement of one of the leaf members.

* * * * *